March 15, 1960  J. W. DAVIS  2,928,364
ADJUSTABLE JIG WELDING TABLE FOR ASSEMBLING PIPE FITTINGS
Filed May 1, 1956  4 Sheets-Sheet 3

INVENTOR.
Joe W. Davis
BY Wayland D. Keith
HIS AGENT.

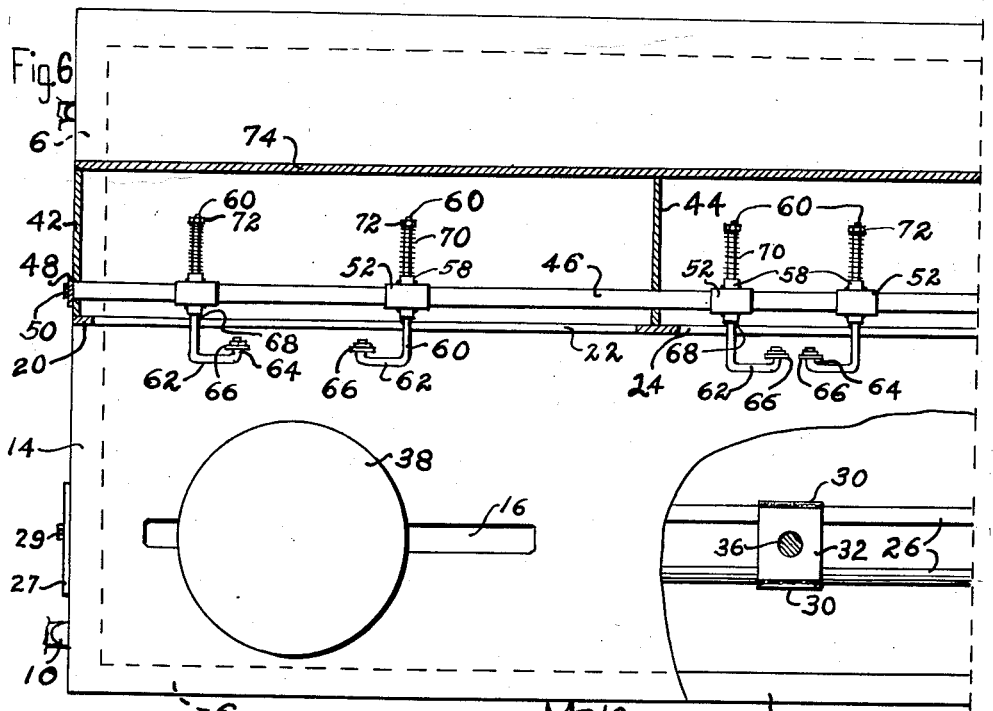
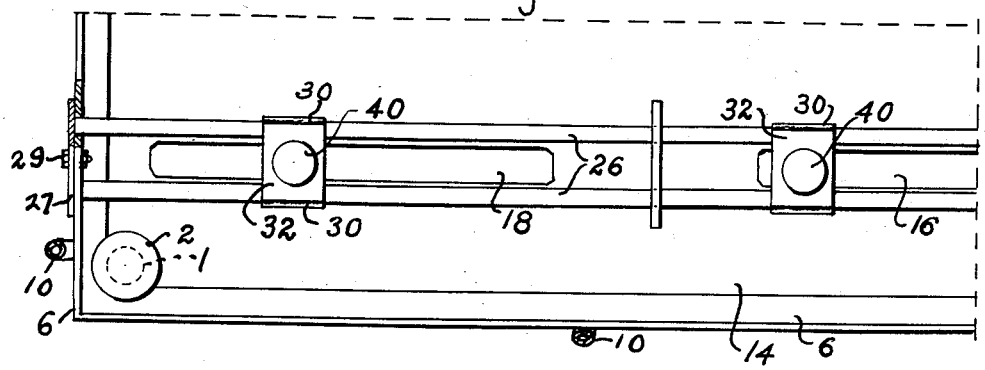
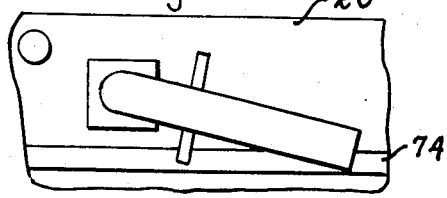
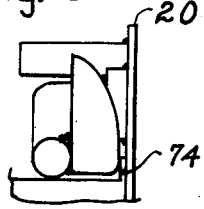

United States Patent Office 2,928,364
Patented Mar. 15, 1960

2,928,364

ADJUSTABLE JIG WELDING TABLE FOR ASSEMBLING PIPE FITTINGS

Joe W. Davis, Wichita Falls, Tex.

Application May 1, 1956, Serial No. 581,983

9 Claims. (Cl. 113—99)

This invention relates to improvements in welding tables and more particularly to an adjustable jig welding table for assembling pipe fittings.

The present jig welding table is so constructed as to enable the assembling and tacking together of pipe fittings of various sizes and kinds, so that the fittings may be uniformly duplicated without the necessity of having a large variety of sizes and shapes of permanent jigs.

Various jigs have been proposed heretofore for welding flanges to L's, T's, and the like so they would be "two-holed," with relation to the holes in the flanges, but such jigs were not readily adaptable to all sizes of fittings nor to various types of fittings.

Another object of the invention is to provide a jig welding table whereby a flange having holes therein and a pipe weld fitting can be welded together so that the holes in the flange and the axis or axes of the pipe weld fitting will be in an exact fixed relation, and which relation will be exactly the same regardless of the number of times the operation is repeated.

Another object of the invention is to provide an adjustable jig welding table on which weld flanged pipe fittings are tacked together in a definite predetermined relation, which table is adjustable to a wide range of sizes and shapes of weld fittings to enable the assembling of various types of assembled weld fittings, such as manifolds, L's, T's, and the like.

Still another object of the invention is to provide a jig welding table having a plurality of fitting holding fixtures whereby plurality of weld fittings may be ganged together to enable the assembling of complex pipe fittings, manifolds and the like, without the necessity of having to build special rigid jigs for the particular job.

A further object of the invention is to provide a jig welding table for welding pipe fittings which has a plurality of flange holding members that are adjustable relative to each other and which are adjustable with respect to individual truing face plates.

Still a further object is to provide a jig welding table which has a plurality of face plates which are adjustable both vertically and longitudinally of the table, so as to enable each face plate to be adjusted at a right angle and at the proper height, and at the proper spacing with respect to the adjustable flange holding members.

Still another object of the invention is to provide a jig welding table that may be readily dismantled for shipment or storage, and reassembled readily.

With these objects in mind and others that will manifest themselves as the description proceeds, reference is to be had to the accompanying drawings, in which like reference characters designate like parts in the several views thereof, in which:

Fig. 5 is a fragmentary, rear elevational view of a portion of the jig welding table, with parts being broken away and with parts shown in section, to bring out the details of construction;

Fig. 6 is a fragmentary top plan view of a portion of the welding table, with portions thereof shown in section, and with parts broken away to show the details of construction;

Fig. 7 is a fragmentary bottom view of the welding table showing the adjustable face plate support rods thereacross, and with parts broken away to show the details of construction;

Fig. 8 is an enlarged fragmentary elevational view of a latch mechanism and the associated parts; and Fig. 9 is a fragmentary and elevational view of the latch mechanism as shown in Fig. 8, together with the associated parts, taken at right angles to the view shown in Fig. 8.

Figure 1:
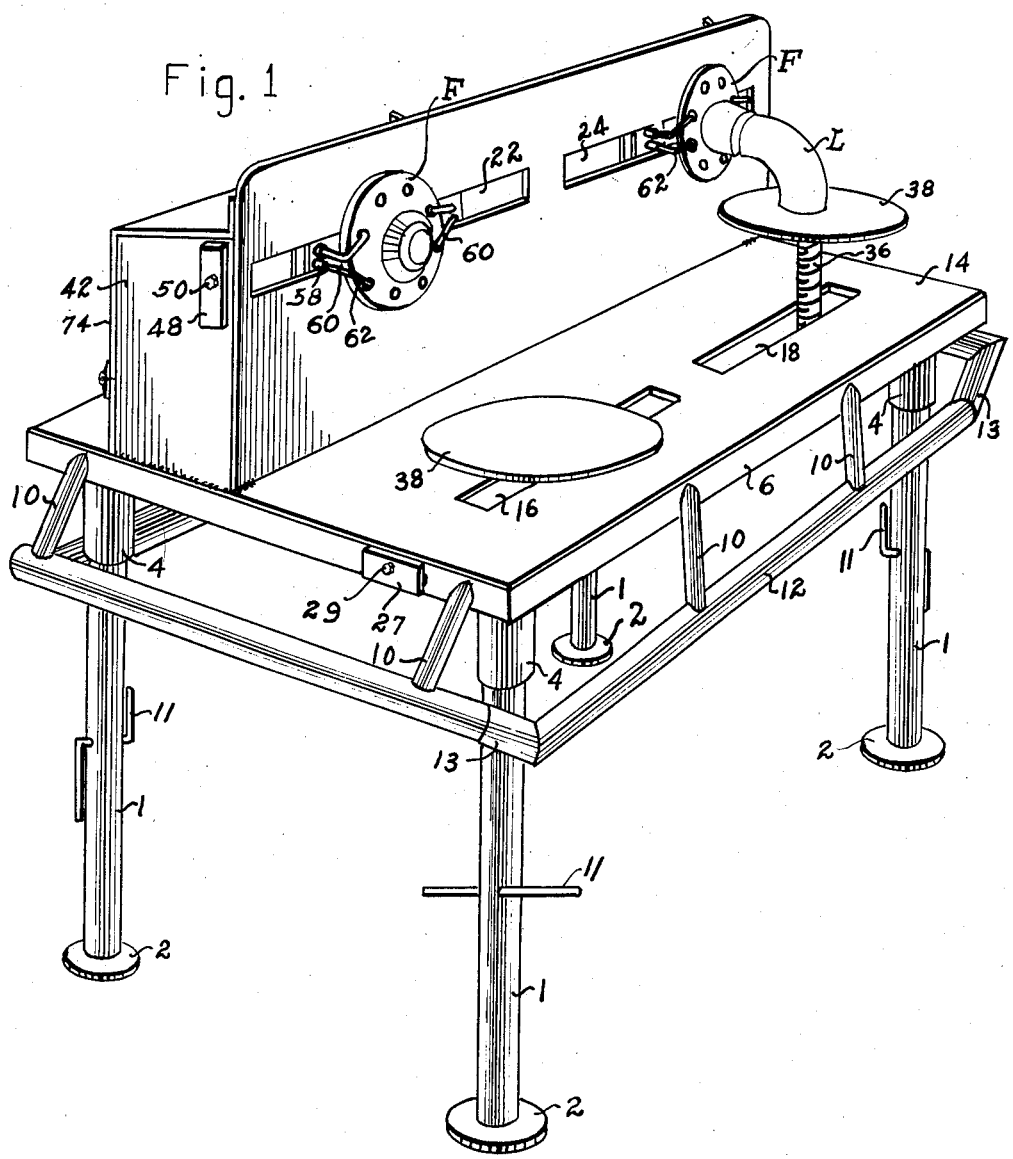
Fig. 1 is a perspective view taken from an end and the front of the table at a point above the level thereof, with a flanged pipe fitting shown attached thereto preparatory to welding.
Figure 2:
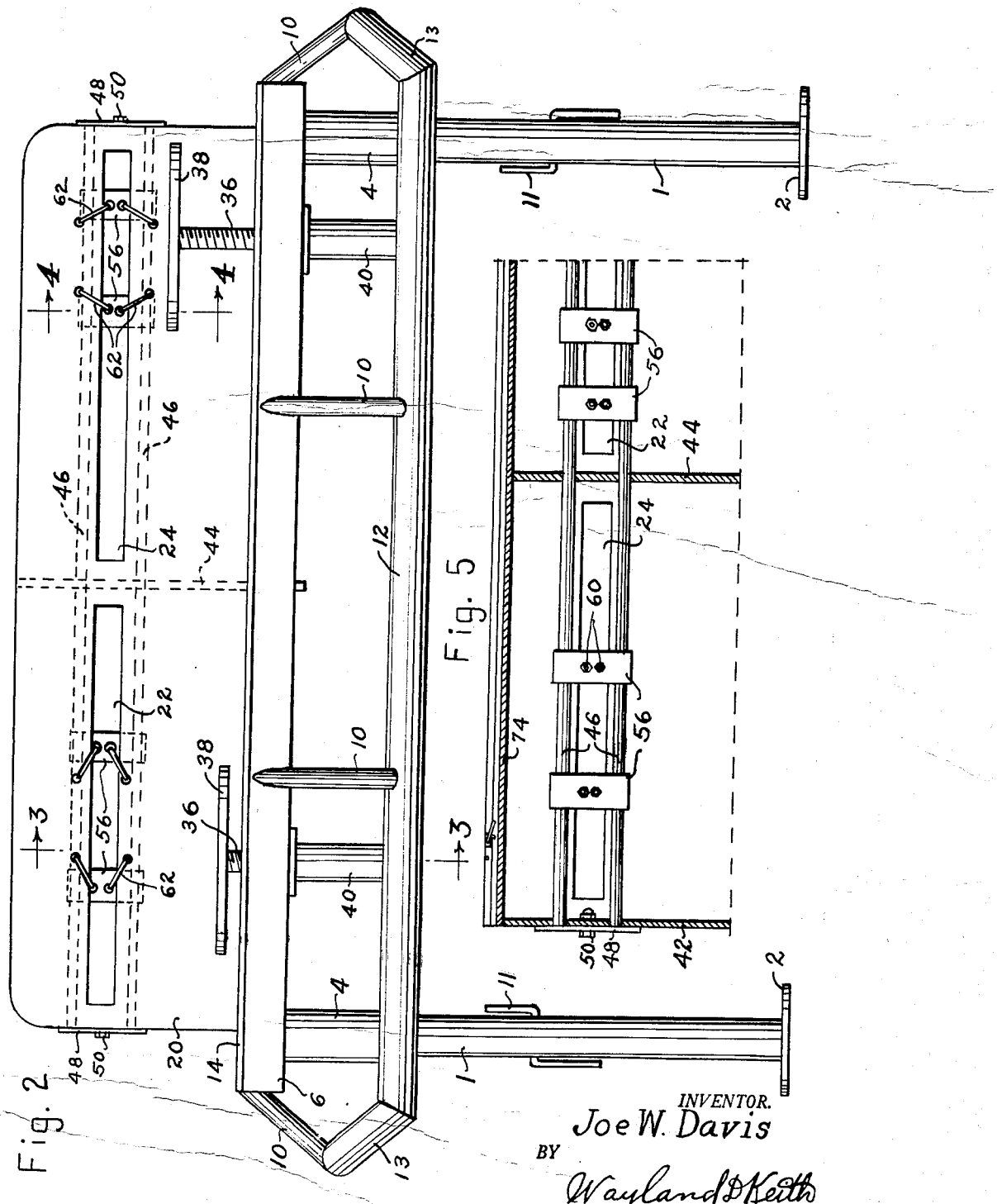
Fig. 2 is a front elevational view of the adjustable jig welding table for pipe fittings.
Figure 3:
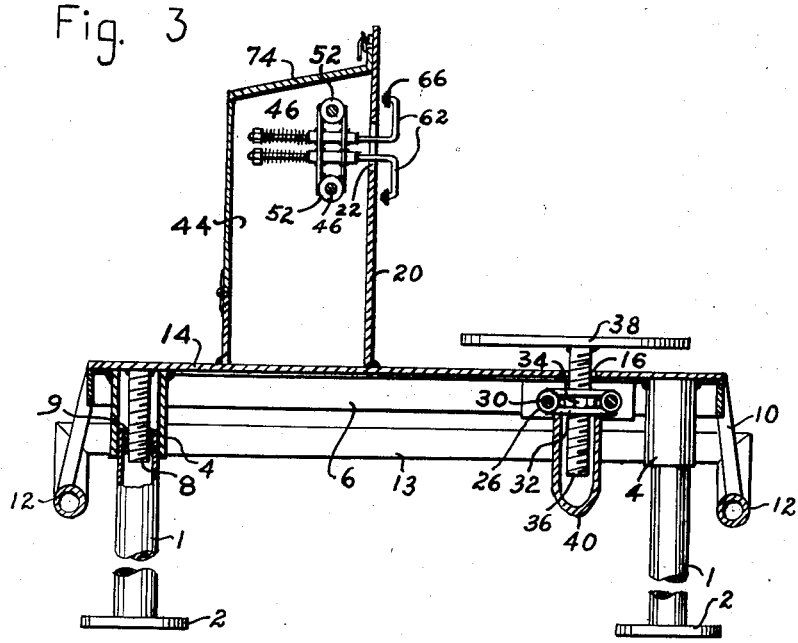
Fig. 3 is a cross sectional view taken on the line 3—3 of Fig. 2, looking in the direction indicated by the arrows.
Figure 4:
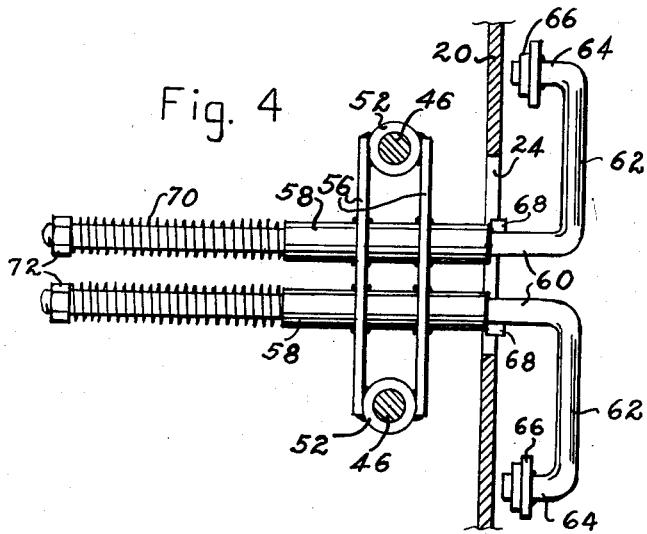
Fig. 4 is an enlarged fragmentary, sectional view taken on the line 4—4 of Fig. 2, looking in the direction indicated by the arrows.

With more detailed reference to the drawing the numeral 1 designates the table legs, each having a plate 2 on the lower end thereof to form a base. The legs extend upward and each is fitted within a socket 4, which sockets are secured near each corner of the table frame members 6, as by welding. A screw threaded bolt member 8 is secured to each corner of the table frame members 6 axially of and within each of the sockets 4, which bolts extend downward to threadably engage the respective threaded nuts 9 which are secured in the upper end of the respective legs 1, so as to attachably and adjustably secure the legs 1 within the respective sockets 4. Each of the legs 1 has a transverse aperture therethrough through which a rod passes, which rod is bent substantially in the shape of a Z to form a handle 11, one end of the projecting rod being on each side of the leg and being arranged to be parallel with respect thereto when in one position, as shown in Fig. 2, and being arranged to turn transversely with respect to the leg so as to enable the ready turning of the leg along the screw threaded member 8, thereby enabling each leg to be individually adjusted to correctly level the table.

The table frame members 6 have downwardly extending support members 10 secured to the bottom thereof and to the top of skid members 12, which skid members support the frame members 6 and sockets 4 above the floor level, when the legs 1 are not in sockets 4.

A plate 14 is secured to table frame members 6, as by welding or the like, so as to form a table that is substantially horizontal. Slots 16 and 18 are cut in the top plate 14 longitudinally thereof for purposes that will be more fully brought out hereinafter.

An upright plate 20 is secured to the top of the table 14 so as to be perpendicular thereto, which upright plate 20 has longitudinal slots 22 and 24 cut therein, which slots are substantially parallel with the face of the table top 14. A pair of spaced apart, longitudinal bars 26 extend through holes in end frame members 6 so that the ends of the bars 26 are flush with the outer face of the end frame members 6. A hole is formed in each end frame member 6 intermediate bars 26 and a cap plate 27 is fitted over each end of each bar 26 and a bolt 29 is passed through an aperture formed in the respective cap plates and through the respective apertures formed in the end frame members 6, so when a nut is fitted on the respective bolts 29, the cap plates will be drawn into binding engagement with each of the end frame members 6 so as to hold the bars 26 against longitudinal movement with respect to end frame members 6.

A threaded nut 3 is secured to one of the bars 32, which nut threadably receives a screw member 36, to the upper end of which screw member, a face plate 38 is attached. The screw threaded member 36 is so positioned relative to the respective longitudinal slots 16 and 18 within the top 14 that the screw threaded member will pass therethrough and slide freely with sleeves 30 along longitudinal rods 26. A thread protector cap 40 is secured to the lowermost of the bars 32. The face of the face plate 38 preferably is perpendicular to the face of the upright plate 20.

The upright plate 20 is braced by end members 42 which are secured thereto and to the plate 14 which forms the table top. An intermediate plate 44 is provided between end members 42 and pairs of holes are formed in end members 42 and plate 44 so the respective holes will be in aligned relation, and through which holes a pair of bars 46 pass, so that the ends of bars 46 will be flush with the outside face of the respective end members 42 when the bars are in position. A cap plate member 48, of sufficient length to cover adjacent ends of bars 46, is positioned on each of the end members 42. Each cap plate member 48 has a hole therein, which is adapted to register with a hole formed within the respective end members 42, so a bolt 50 may be passed therethrough, and, upon tightening the bolts 50 the cap plate members 48 may be drawn into binding engagement with end members 42, which will prevent longitudinal movement of bars 46 with respect to end members 42. However, upon loosening the respective bolts 50 that hold the cap plates, these may be turned slightly, or removed, which enables the ready removal of the bars 46.

A pair of sleeves 52 are slidably fitted on the respective longitudinal bars 46, which sleeves are secured together by bars 56 so that the sleeves will slide along the longitudinal bars as a unit.

Each of the bars 56 has a pair of apertures formed transversely therethrough within which apertures the respective guide bearing sleeves 58 are fitted, within which guide bearing sleeves flange arm holding shafts 60 are slidably fitted. One end of each arm holding shaft has a laterally extending arm 62 and on each arm a reentrant end 64 has a hole engaging stepped plug member 66. A stop 68 is formed intermediate the laterally extending arm 62 and the adjacent end of the guide bearing sleeves 58. The stop 68 permits free swinging action of laterally extending arm 62, but is so positioned as to prevent the arms from engaging the upright plate member 20.

The end of each shaft 60 opposite the laterally extending arms 62 is threaded. Compression springs 70 telescope over each of the respective shafts and are in bearing relation with the ends of the respective guide bearing sleeves 58. A nut 72 is provided on each of the screw threaded ends of the shafts 60 so as to retain the respective springs 70 thereon. The bars 46 are parallel with respect to slots 22 and 24 and are so positioned that pairs of shaft 60 extend out through slots 22 and 24 so that the laterally extending arms 62 are free to swing about the axis of the respective shafts 60 so that the stepped plugged member 66 will engage a particular hole in the flanged fitting F, to which a pipe fitting, such as an L, is abutted to enable the pipe fitting L to be correctly secured to the flange F.

The pairs of arms 62, together with sleeves 52, are slidably longitudinally of bars 46, within the limits of the respective slots 22 and 24, so as to enable the respective sets of arms, which engage a flange, to be correctly fitted in holes of a particular size, and also enabling each set of arms, positioned in the respective slots 22 and 24, to be adjustably spaced with respect to each other. Likewise, the face plates 38 may be moved to correspond with the particular set of arms 62. The face plate 38 being adjustable vertically by turning the plate 38 to raise and lower the face plate by action of screw 36 engaging nut 34.

It is preferable to have a covering 74 hingeably secured to end plates 42, which cover houses longitudinal bars 46, sliding sleeve members 52 together with the associated mechanism.

The skids 12 have each end upturned, as shown at 13, so as to enable moving of the table easily over the floor when not on legs 1.

Operation

With the welding jig table mounted on legs 1 a flange F is fitted against upright plate 20, which is perpendicular to plate 14, each of the arms 62 is swung about the respective shaft 60 until hole engaging step plug members 66 engage the proper holes in flange F, whereupon, the flange F is held against perpendicular, upright plate 20 with the holes thereof in symmetrical relation with respect to a vertical plane passing through an axis of the flange. The face plate 38, attached to the upper end of screw member 36, is adjusted vertically until a weld fitting, such as an L will seat on face plate 38 with the other face thereof in aligned, abutting relation with the weld face of the flange F. The weld fitting L is then tack welded to the flange F at several places so as to maintain the two in fixed relation when the weld fitting is removed from the jig welding table. The welding operation may then be completed on any type of stand or table, thereby freeing the adjustable jig welding table for use in tack welding fittings to the weld flanges in a minimum of time and in great numbers.

In this manner, one welder can tack weld a great number of fittings, sufficient to supply a number of welders with fittings, with the flanges F being in correct "two holed" relation with respect to the weld fitting L.

It is to be understood, that while a weld fitting L is shown to be an L, any other type fitting, such as a T, or a cross or the like, may be welded to flanges F by the proper adjustment of the face plate 38 until the face of the weld fitting L and the weld face of the flange are in abutting relation.

A pair of sleeves 52 slidably mount pairs of arms 62 for sliding movement along a pair of bars 46, so that each pair of arms 62 may be adjusted toward or away from the complementary pairs of arms 62 mounted in the respective slots 22 or 24. Therefore, a flange may be attached to the arms 62 that are positioned within slot 22 and another flange may be positioned on arms 62 in slot 24, then by adjusting the center distances of the flanges to the correct spacing, a manifold may be tack welded between two flanges F and other fittings may be fitted within the manifold, between the flanges F, by resting such fittings on face plates 38, which face plates may be adjusted longitudinally along bars 26 and the face plates adjusted vertically by means of screw members 36. After one section of the manifold is assembled, it may be moved longitudinally of the upright vertical plate 20 and the arms that previously engaged one flange may be moved so as to engage the other of said arms and a new flange put on the arms which had been occupied by the first flange, and the center distance adjusted to a manifold of any desired length, with the spacing between flanges to be any center distance within the range of adjustability of pairs of arms 62 within the length of slots 22 and 24, or if desired, a table may be constructed of any number of pairs of arms within slots similar to slots 22 and 24, and any number of face plates 38 on screws 36 may be mounted on pairs of bars 62 so any desired adjustment may be obtained.

While the invention has been described and illustrated in some detail, in one embodiment thereof, it is to be understood that changes may be made in the minor details of construction, and adaptations made to different types of work without departing from the spirit of the invention or the scope of the appended claims.

Having thus clearly shown and described the invention what is claimed as new and desired to secure by Letters Patent is:

1. An adjustable jig welding table for assembling pipe weld flanges and pipe fittings, comprising a horizontal supporting base, an upstanding plate secured perpendicular to said base, longitudinally thereof, a pair of upstanding end plates secured to said supporting base and one to each end of said upstanding plate, said upstanding end plates each having a pair of spaced apart holes formed therein, one above the other and having their respective axes substantially in horizontal alignment, bars fitting within said respective holes so as to be in aligned, parallel relation with said upstanding plate and with said horizontal supporting base, a slot formed in said upstanding plate adjacent to and parallel with said parallel bars, pairs of tubular members slidably fitted on each of said bars, bars abridging said tubular members and secured thereto so said tubular members will slide, as a unit, along said bar, said abridging bars having pairs of holes formed therethrough with the axis thereof substantially at right angles to the axis of said tubular members, a sleeve secured within each of said holes, a shaft extending through each of said sleeves and through said slot and having outwardly extending arms on the opposite side of said upstanding plate from said parallel bars, a re-entrant end portion on each of said arms, a stepped plug, presenting different diameters, on each re-entrant portion on each arm, a spring telescoped over each of said shafts, on the end opposite that to which the arms are secured, a spring retaining means on each of said shafts opposite the end to which the arms are secured, so as to retain said springs on said shafts.

2. The device subsantially as set forth in claim 1, wherein a cap member attachably secures said parallel bars in fixed relation with respect to said upstanding plate.

3. The device substantially as set forth in claim 1, wherein a pair of parallel bars is supported beneath said horizontal supporting base, a longitudinal slot formed in said horizontal supporting base in parallel relation to said last mentioned pair of parallel bars, a pair of tubular members slidably fitted on said last mentioned parallel bars, a bar member abridging said tubular member and secured thereto, screw threads formed within said abridging bar at substantially right angle to the axis of said parallel bars, a screw threaded member threadably engaging said abridging bar, and a horizontal face plate mounted on the upper end of said screw threaded member.

4. The device substantially as set forth in claim 3, wherein a cap member secures said last mentioned pair of longitudinal bars in attachable relation with respect to said horizontal supporting base.

5. The device substantially as set forth in claim 3, wherein supporting legs are threadably secured to each corner of said horizontal supporting base, and pivoted handle means on said legs for rotating said legs.

6. The device substantially as set forth in claim 3, wherein skid members extend below said horizontal supporting base to support said base.

7. An adjustable welding jig for assembling pipe weld flanges and pipe fittings; comprising a horizontal supporting base, an upstanding plate secured perpendicularly to said base and being disposed longitudinally thereof, support means connected to said upstanding plate near each end thereof and extending rearward therefrom, at least one elongated member secured to and extending between said support means, independently movable means mounted on said elongated member for relative sliding movement thereon, two pairs of flange holding arms for each flange, which arms of said pairs are spaced apart laterally and each being independently mounted for pivotal movement on said independently movable means on said elongated member for pivotal movement relative to said upstanding plate on the opposite sides of a position to be occupied by a weld flange having bolt holes formed on opposite sides thereof, each of said arms of said pairs of arms having an inturned hook thereon, the inturned hooks of one pair of arms being adapted to engage complementary bolt holes formed in one side of the weld flange when said weld flange is in said position on said upstanding plate, and the hooks of the other pair of arms being adapted to engage complementary holes in said weld flange formed diametrically opposite said first mentioned holes, and vertically adjustable means mounted on said horizontal supporting base for supporting a weld fitting in abutting relation with said flange.

8. An adjustable jig welding device for assembling pipe weld flanges and pipe fittings; comprising a horizontal supporting base, an upstanding plate secured perpendicularly to said supporting base and being disposed longitudinally thereof, a pair of horizontally disposed, parallel bars mounted on said upstanding plate on the side opposite said horizontally disposed base, an upstanding plate having a longitudinal slot formed therein, adjacent to and parallel with said parallel bars, two pairs of flange holding arms for each flange, which pairs of arms are slidably mounted on said longitudinal bars in position to extend through said longitudinal slot, each of which arms is independently mounted for pivotal movement with respect thereto, each of said arms of said pairs of arms having an inturned hook on the end thereof, the inturned hooks of one pair of arms being adapted to engage complementary bolt holes formed in one side of said weld flange when said weld flange is in position on the opposite side of said upstanding plate from said parallel bars, the other pair of said arms being adapted to engage complementary holes formed in the opposite side of said flange, and a screw threaded, adjustable support mounted on said horizontal support to support a weld fitting in abutting relation with said flange.

9. The device as defined in claim 8, wherein groups, consisting of two each, of said holding arms are slidably mounted on said parallel bars, and wherein resilient means are provided on said arms to move said arms into binding engagement with said flanges mounted on said upstanding plate.

References Cited in the file of this patent

UNITED STATES PATENTS

| | | |
|---|---|---|
| 2,030,594 | Hyde et al. | Feb. 11, 1936 |
| 2,323,039 | Hill | June 29, 1943 |
| 2,431,101 | Woods | Nov. 18, 1947 |
| 2,452,985 | Bourdette | Nov. 2, 1948 |
| 2,774,134 | Smith et al. | Dec. 18, 1956 |

FOREIGN PATENTS

| | | |
|---|---|---|
| 750,864 | Germany | Jan. 31, 1945 |